Dec. 30, 1958   C. P. ROTH   2,866,220
WINDSHIELD WIPER TRANSMISSION ASSEMBLY
Filed June 23, 1955
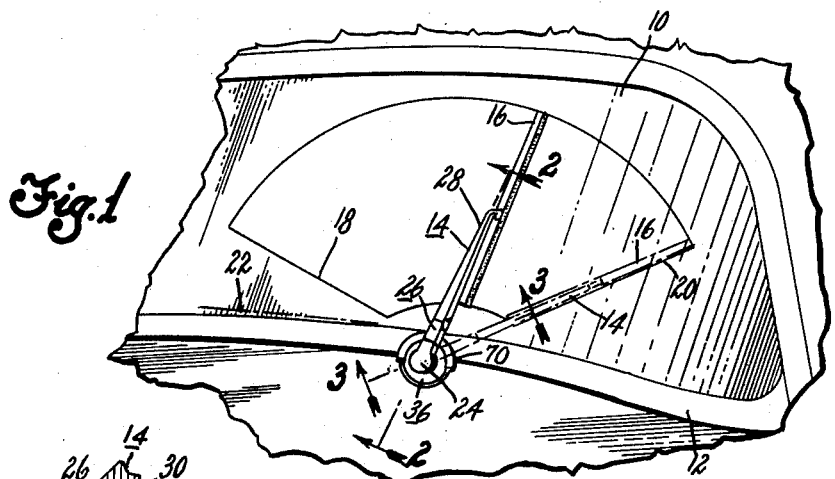
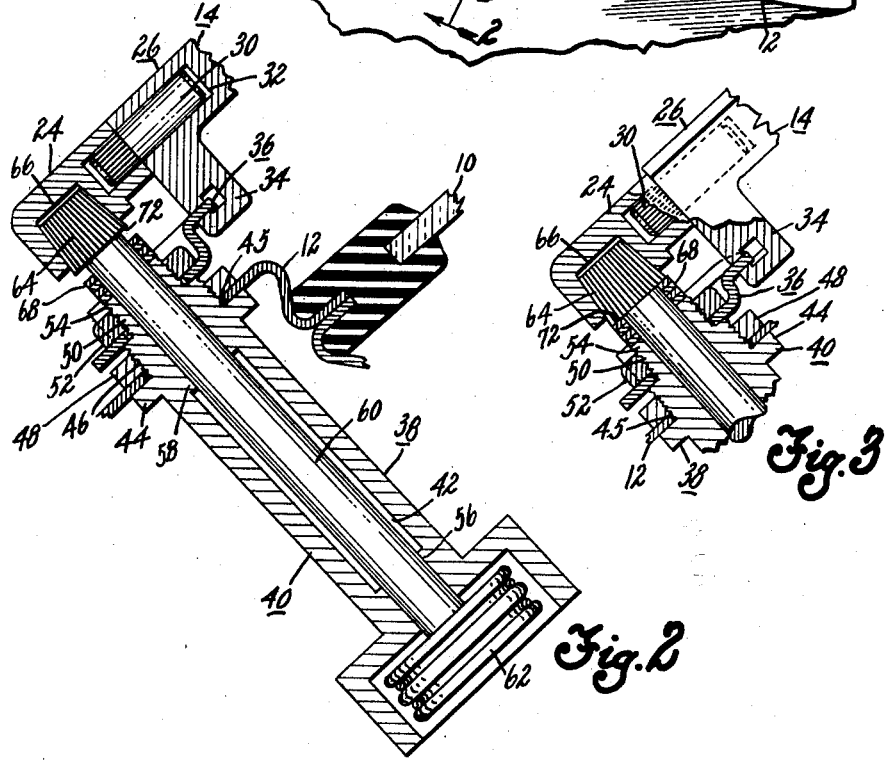
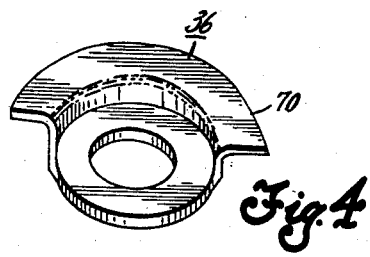
INVENTOR.
CHARLES P. ROTH
BY
Craig V. Morton
HIS ATTORNEY

# United States Patent Office 2,866,220
Patented Dec. 30, 1958

2,866,220

WINDSHIELD WIPER TRANSMISSION ASSEMBLY

Charles P. Roth, Dearborn, Mich., assignor to General Motors Corporation, Detroit, Mich., a corporation of Delaware Application June 23, 1955, Serial No. 517,605

12 Claims. (Cl. 15—253)

This invention pertains to windshield wipers, and particularly to an improved transmission assembly for vehicle windshield wipers.

Heretofore, it has been proposed to incorporate stroke limiting means of a resilient nature in conjunction with oscillatable windshield wipers to reduce the abruptness of movement reversals at the ends of the strokes. The present invention relates to automatically operable, cushioning brake means for eliminating undesirable wiper arm "slap" at the outboard stroke end by gradually decelerating the wiper arm adjacent the outboard stroke end. The apparatus of this invention reduces the abruptness of movement reversals at the outboard stroke end, prevents overtravel of the wipers at the outboard stroke end, reduces the fatigue stresses on the windshield wiper transmission assembly as well as the driving means, and results in smoother and more consistent outboard stroke end positions. Accordingly, among my objects are the provision of means for decelerating a wiper adjacent the outboard stroke end thereof; the further provision of cushioning brake means for decelerating a wiper adjacent the outboard stroke end during the outboard stroke and permitting acceleration of the wiper during the first part of the inboard stroke; and the still further provision of a wiper transmission assembly including automatically operable, cushioning brake means for eliminating wiper arm "slap" at the outboard stroke end.

The aforementioned and other objects are accomplished in the present invention by incorporating a disc brake assembly in a wiper shaft transmission having an axially movable transmission shaft. Specifically, the cushioning brake assembly of this invention is designed for use with a wiper transmission assembly and windshield cleaner of the type disclosed in the Oishei, et al., Patent No. 2,691,186. However, the brake means of this invention could obviously also be incorporated in other windshield cleaning systems wherein the transmission shaft has imparted thereto compound movement comprising an oscillation component and an axial movement component, such as disclosed in the Barker Patent 2,027,365. Thus, the embodiment disclosed herein, as incorporated in the cleaner assembly of the aforementioned Oishei, et al., patent, is only exemplary, and is not to be construed as a limitation.

The transmission assembly in the disclosed embodiment, comprises a stationary housing for a transmission shaft and a pulley assembly drivingly connected with the shaft. The housing is rigidly mounted in the cowl portion of the vehicle, and extends through an opening therein. The pulley housing is usually disposed beneath the instrument panel of the vehicle so as to be concealed thereby. The shaft housing has a through bore, and portions thereof constitute bushings, or plain bearings, for journaling the transmission shaft that extends therethrough. The pulley assembly is connected to the inner end of the transmission shaft, and the drive arrangement therefor may be of the type disclosed in the McClelland Patents 2,617,315 and 2,660,894, assigned to the assignee of this invention. A drive burr, or longitudinally serrated head, is rigidly connected to the outer end of the transmission shaft.

The mounting section of a wiper arm is drivingly connected with the burr. In the disclosed embodiment, the wiper arm is of the type shown in the aforementioned Oishei, et al., patent, this again being only exemplary, and, thus, includes a shaft anchoring part, a rockable part, and a blade carrying section pivotally connected to the rockable part and spring biased towards the vehicle windshield. The rockable part is journaled on a pin carried by the anchoring part, and has a cam follower which engages a stationary, double-acting cam carried by the transmission housing. The stationary cam is contoured so that during a portion of the wiper stroke adjacent the outboard stroke end, the rockable part and the blade carrying section of the arm are rotated about the longitudinal arm axis, thereby maintaining the blade at a substantially normal attitude relative to the windshield. In order to achieve this result, the stationary cam is contoured so that a portion thereof is bent inwardly towards the rear of the vehicle so that in addition to rotating the rockable part of the blade, the transmission shaft has imparted thereto concurrently inward and outward axial movement. Thus, during approximately the last 25% of the outboard stroke, the transmission shaft moves axially inward, while during the first 25% of the inboard stroke, the transmission shaft moves axially outward. In order to achieve the results hereinbefore alluded to, and, in particular, in order to obviate wiper arm "slap" at the outboard stroke end, a single brake disc, or a plurality of brake discs, are supported on the transmission shaft between the drive burr and the outer end of the transmission housing. The brake means are disengaged at the inboard stroke end, the parked position, and throughout substantial'y 75% of the inboard and outboard wiper strokes. However, during the last 25% of the outboard stroke, the transmission shaft moves axially inward and the brake discs are automatically engaged and thereby decelerate angular movement of the shaft and wiper arm. Conversely, during the first 25% of the inboard stroke, the cushioning brake means are gradually released to permit acceleration of the transmission shaft and the wiper arm.

Further objects and advantages of the present invention will be apparent from the following description, reference being had to the accompanying drawing wherein a preferred embodiment of the present invention is clearly shown.

In the drawing:

Fig. 1 is a fragmentary view, in elevation, of a vehicle equipped with the improved wiper transmission assembly of this invention.

Fig. 2 is an enlarged, fragmentary sectional view, taken generally along line 2—2 of Fig. 1, with the brake means released.

Fig. 3 is a fragmentary sectional view similar to Fig. 2 with the brake means fully engaged.

Fig. 4 is a perspective view of a stationary cam so contoured to effect inward and outward axial movement of the transmission shaft.

With particular reference to Fig. 1, a vehicle is shown having a wrap-around windshield 10 and a cowl 12. The vehicle includes windshield cleaning apparatus, which, according to conventional practice, may include a wiper motor, not shown, and a pair of spaced oscillatable wipers which operate asymmetrically. Only one wiper is disclosed in Fig. 1, and this wiper comprises an arm 14 which detachably carries a blade 16. The arm 14 is drivingly connected to a shaft, to be described later, and the shaft is drivingly connected with the motor so that during operation, the blade 16 is oscillated between an inboard stroke end indicated by line 18 and an outboard stroke end indicated by line 20. Moreover, according to conventional practice, the wiper blade may be moved to a parked position adjacent the cowl, as indicated by line 22, when operation is discontinued.

The wiper arm 14, as disclosed in Figs. 1 and 2, comprises a mounting section 24, a rockable section 26, and a blade carrying section 28. The rockable section 26 is connected to the mounting section 24 by means of a pin 30, the inner end of which is rigidly connected to the mounting section 24, and the outer end of which is disposed within a cylindrical recess 32 in the rockable section 26, so that the section 26 and the blade carrying section 28 are free to pivot relative to the section 24 about the longitudinal arm axis. In order to achieve this result, the rockable section 26 is formed with a cam follower 34, which engages opposed surfaces of a double-acting stationary cam 36.

The invention disclosed herein pertains to an improved transmission assembly for the windshield cleaner, which transmission assembly is generally depicted by the numeral 38. The transmission assembly comprises a stationary housing 40 having an axial through bore 42. The housing 40 extends through an aperture 45 in the cowl 12 and is formed with a shoulder 44 arranged to abut the inner surface of the cowl 12. The housing 40 includes a threaded portion 46 arranged to receive an escutcheon nut 48 for rigidly connecting the housing 40 to the vehicle. In this instance, the housing 40 includes a second threaded portion 50, which receives a nut 52 for attaching the fixed cam 36 to the housing 40. The housing 40 terminates outwardly of the cam 36 and presents a shoulder 54.

The through bore 42 of the housing 40 is formed with internal shoulders 56 and 58, which constitute plain bearing surfaces for rotatably journaling a transmission shaft 60. A pulley assembly 62 is drivingly connected to the inner end of the shaft 60 and disposed within a pulley housing which may be integral with the shaft housing 40. A drive burr 64, having longitudinal serrations, is rigidly connected to the outer end of the transmission shaft 60. It is to be understood that in accordance with conventional practice, the pulley assembly 62 may be connected with the motor, not shown, by means of a flexible cable drive of the type shown in either of the aforementioned McClelland patents.

The mounting, or socket section, 24 of the arm is formed with a complementary serrated recess 66, which receives the burr 64 so as to establish a driving connection between the shaft 60 and the wiper including arm 14 and blade 16. The cushioning brake means of this invention comprises one or more friction discs 68 composed of either brass, nylon, or other suitable plastics, which discs are in the form of an annulus and are mounted on the shaft 60. The disc, or discs, 68 are disposed between the inner end of the drive burr 64 and the end 54 of the housing 40.

The cushioning brake is shown in the released, or disengaged, position in Fig. 2, while Fig. 3 depicts the engaged, or applied, position of the brake. As hereinbefore alluded to, the rockable section 26 having the cam follower 34, which engages the stationary cam 36, results in compound movement of the shaft 60. More particularly, as depicted in Fig. 4, the profile of the cam 36 is such that the outboard portion 70 thereof is curved inwardly towards the rear of the vehicle so that during substantially the last 25% of the outboard stroke movement, or between the full and dotted line positions of the blade and arm in Fig. 1, the portion 70 of the cam profile results in inward axial movement of the shaft 60, the burr 64 and the arm 14. Throughout 75% of the inboard and outboard strokes between the line 18 and the full line position of the blade and arm, as depicted in Fig. 1, only angular movement is imparted to the shaft 60, since the profile of cam 36 is substantially planar. Thus, at the park position indicated by line 22, the inboard stroke end depicted by line 18, and at the full line position of the blade in Fig. 1, the cushioning brake means of this invention are released, as depicted in Fig. 2. However, between the full line position of the blade and arm depicted in Fig. 1 and the dotted line position, indicating the outboard stroke end 20, the shaft 60 and the drive burr 64 move axially inward, as depicted in Fig. 2 to the position of Fig. 3. Thus, during this movement, the burr engages the discs 68 and decelerates angular movement of the shaft 60 and the wiper arm 14. In other words, when the burr 64 moves inwardly relative to the housing 40, the discs 68 are compressed between the inner end surface 72 of the burr and the surface 54 of the transmission housing. Conversely, during the first 25% of inboard stroke, the shaft 60 moves axially outward and gradually releases the brake means permitting acceleration of the wiper.

From the foregoing, it is apparent that the improved transmission assembly of this invention is operable to automatically decelerate and permit acceleration of the wiper adjacent the outboard stroke end position. This arrangement eliminates objectionable wiper arm "slap," eliminates over-travel of the wiper at the outboard stroke end, and appreciably reduces the fatigue stresses imposed upon the entire cleaning mechanism including the wiper shaft transmissions, the drive means, and the motor. These results are all achieved by reducing the abruptness of movement reversal of the wiper adjacent the outboard stroke end.

While the embodiment of the present invention as herein disclosed, constitutes a preferred form, it is to be understood that other forms might be adopted.

What is claimed is as follows:

1. The combination with a windshield cleaner having an oscillatable wiper, and means operatively connected with said wiper for imparting oscillation thereto throughout a wiping stroke, or automatically operable friction brake means operatively connected with said wiper for decelerating said wiper during a portion of said wiping stroke.

2. The combination with a windshield cleaner having a wiper, and means for imparting oscillation thereto throughout a wiping stroke having an outboard stroke end and an inboard stroke end, of automatically operable friction brake means operatively connected with said wiper for decelerating said wiper during a portion of said stroke adjacent one of said stroke ends.

3. The combination with a windshield cleaner having a wiper, and means for imparting oscillation to said wiper throughout a wiping stroke having an outboard stroke end position, an inboard stroke end position and a parked position, of friction brake means for decelerating the oscillation of said wiper, and means for actuating said decelerating means only adjacent the outboard stroke end position.

4. The combination with a windshield cleaner having a wiper, and means for imparting oscillation to said wiper throughout a wiping stroke having an outboard stroke end position, an inboard stroke end position and a parked position, of brake means operatively connected with said wiper for decelerating the oscillation thereof, and means for actuating said brake means so as to decelerate said wiper during a portion of the outboard stroke thereof adjacent the outboard stroke end position, said last recited means also permitting acceleration of said wiper during the first portion of said inboard stroke, said brake means being released when said wiper is in the parked position.

5. A wiper shaft transmission assembly including, a stationary housing, a wiper shaft rotatably journaled in said housing and capable of axial movement relative thereto, means for effecting axial movement of said shaft during angular movement thereof, and means operatively connected with said shaft for decelerating the angular movement of said shaft during axial movement thereof.

6. A wiper shaft transmission assembly including, a stationary housing, a wiper shaft rotatably journaled in said housing and capable of axial movement relative thereto, means for effecting axial movement of said shaft during oscillation thereof, an automatically operable brake means operatively connected with said shaft for decelerating oscillation of said shaft during axial movement thereof.

7. A wiper shaft transmission assembly including, a stationary housing, a wiper shaft rotatably journaled in said housing and capable of inward and outward axial movement relative thereto, means for effecting inward axial movement of said shaft during a first portion of its oscillation and outward movement of said shaft during a second portion of its oscillation, and means operatively connected with said shaft for decelerating the oscillation of said shaft during said first portion and permitting acceleration of said shaft during said second portion.

8. A wiper shaft transmission assembly including, a stationary housing, a wiper shaft rotatably journaled in said housing and capable of inward and outward axial movement relative thereto, means for effecting axial movement of said shaft during oscillation thereto, brake means operatively connected with said shaft for decelerating oscillation thereof, and means for actuating said brake means during axial movement of said shaft.

9. A wiper shaft transmission assembly including, a stationary housing, a wiper shaft rotatably journaled in said housing and capable of inward and outward axial movement relative thereto, means for effecting inward and outward axial movement of said shaft during oscillation thereof, brake means operatively connected with said shaft for decelerating said shaft during oscillation thereof, and automatically operable means for engaging said brake means to decelerate shaft oscillation during inward axial movement of said shaft while releasing said brake means during outward axial movement thereof.

10. A wiper shaft transmission assembly including, a stationary housing, a wiper shaft rotatably journaled in said housing and capable of axial movement relative thereto, a driving head attached to said shaft, means for effecting axial movement of said shaft during oscillation thereof, and friction brake means disposed between said driving head and said housing so as to be engaged by said head and said housing during axial movement of said shaft to decelerate oscillation thereof.

11. A wiper shaft transmission assembly including, a stationary housing, a wiper shaft rotatably journaled in said housing and capable of axial movement relative thereto, a driving head attached to said shaft, means for effecting axial movement of said shaft during oscillation thereof, and disc brake means interposed between said driving head and said housing and engageable therewith during axial movement of said shaft for decelerating oscillation thereof.

12. A wiper shaft transmission assembly including, a stationary housing, a wiper shaft rotatably journaled in said housing and capable of inward and outward axial movement relative thereto, a driving head attached to said shaft, means for effecting inward and outward axial movement of said shaft during oscillation thereof, and disc brake means interposed between said driving head and said housing so as to be engaged therewith during inward axial movement of said shaft to decelerate shaft oscillation, while being disengaged during outward axial movement of said shaft to permit acceleration of said shaft.

References Cited in the file of this patent

UNITED STATES PATENTS

| 2,027,365 | Barker | Jan. 14, 1936 |
| 2,298,197 | Coffey | Oct. 6, 1942 |
| 2,744,282 | Dyer et al. | May 8, 1956 |

FOREIGN PATENTS

| 645,731 | France | July 3, 1928 |